(12) United States Patent
Ebenezer

(10) Patent No.: US 11,025,324 B1
(45) Date of Patent: Jun. 1, 2021

(54) INITIALIZATION OF ADAPTIVE BLOCKING MATRIX FILTERS IN A BEAMFORMING ARRAY USING A PRIORI INFORMATION

(71) Applicant: CIRRUS LOGIC INTERNATIONAL SEMICONDUCTOR, LTD., Edinburgh (GB)

(72) Inventor: Samuel P. Ebenezer, Gilbert, AZ (US)

(73) Assignee: CIRRUS LOGIC, INC., Austin, TX (US)

( * ) Notice: Subject to any disclaimer, the term of this patent is extended or adjusted under 35 U.S.C. 154(b) by 0 days.

(21) Appl. No.: 16/848,984

(22) Filed: Apr. 15, 2020

(51) Int. Cl.
  *H04B 7/06* (2006.01)
  *H04B 17/345* (2015.01)
  *H04B 17/382* (2015.01)
  *H04B 7/0417* (2017.01)

(52) U.S. Cl.
  CPC ........... *H04B 7/063* (2013.01); *H04B 7/0421* (2013.01); *H04B 17/345* (2015.01); *H04B 17/382* (2015.01)

(58) Field of Classification Search
  CPC .. H04B 7/0617; H04B 7/0413; H04B 7/0421; H04B 17/345; H04B 17/382; H04B 7/063
  USPC .......... 375/262, 267, 299, 347–350
  See application file for complete search history.

(56) References Cited

U.S. PATENT DOCUMENTS

| | | | | |
|---|---|---|---|---|
| 8,005,238 B2* | 8/2011 | Tashev | ............ | H04R 3/005 381/94.2 |
| 8,249,862 B1* | 8/2012 | Cheng | ............ | G10L 21/0208 704/205 |
| 8,565,446 B1 | 10/2013 | Ebenezer | | |
| 9,607,603 B1 | 3/2017 | Ebenezer | | |
| 2007/0055505 A1* | 3/2007 | Doclo | ............ | G10L 21/0208 704/226 |
| 2011/0142025 A1* | 6/2011 | Agee | ............ | H04B 7/0413 370/342 |
| 2012/0076316 A1* | 3/2012 | Zhu | ............ | G01S 3/801 381/71.11 |
| 2015/0071461 A1* | 3/2015 | Thyssen | ............ | G10L 21/0208 381/94.1 |

(Continued)

OTHER PUBLICATIONS

U.S. Appl. No. 16/258,911, filed Jan. 28, 2019, Ebenezer, et al.

*Primary Examiner* — Emmanuel Bayard
(74) *Attorney, Agent, or Firm* — Mitch Harris, Atty at Law, LLC; Andrew M. Harris

(57) ABSTRACT

An adaptive beam-forming array uses multiple sensors and noise reference subtraction to reduce noise at an output of the adaptive beam-forming array. A direction of arrival of energy from a desired source is determined and an inter-sensor noise correlation between one or more pairs of sensors is determined. An Adaptive Blocking Matrix (ABM) generates a noise reference from an inter-sensor model representing a relationship between desired signal components received from the desired source and that are present in signals from one or more pairs of sensors. The noise reference is generated with an adaptive filter that filters a first signal from a first sensor in the pairs of sensors and is combined with the second signal from a second sensor in the pairs of sensors to produce the noise reference. The adaptive filter is initialized with an initialization response computed from the direction of arrival and the inter-sensor noise correlation.

24 Claims, 10 Drawing Sheets

(56) References Cited

U.S. PATENT DOCUMENTS

2017/0330580 A1* 11/2017 Wolff .................... H04R 3/005
2019/0348056 A1* 11/2019 Christoph ........... G10L 21/0208

* cited by examiner

INITIALIZATION OF ADAPTIVE BLOCKING MATRIX FILTERS IN A BEAMFORMING ARRAY USING A PRIORI INFORMATION

BACKGROUND

1. Field of Disclosure

The field of representative embodiments of this disclosure relates to acoustic beamforming sensor arrays that include adaptive blocking matrixes to reduce noise, and systems and methods that pre-initialized the adaptive blocking matrix filters using a priori information.

2. Background

Present-day devices that capture speech or other acoustic information may use more than one microphone in order to improve the reception of a desired acoustic source, i.e., a speaker being tracked by a speakerphone, wireless telephone, smart speaker, computer microphone inputs, or other devices such as those that receive speech or other audio for speech recognition or voice communications.

With the availability of small and low-energy-cost digital signal processing, the received voice signal can be improved to remove background interference and noise using beamforming techniques. One technique that has been applied for removing background interference as noise, is use of an adaptive beamformer using an adaptive blocking matrix such as those described in U.S. Pat. Nos. 9,607,603 and 8,565,446, the disclosures of which are incorporated herein by reference in their entireties. The adaptive blocking matrix uses an adaptive filter to combine pairs of microphone signals so that a model of everything except desired speech in the main beam of the beamformer is modeled, which is then subtracted via another adaptive filter from a main beamformer output to remove sidelobes, interference and noise. Such beamformers operate very well compared to an individual microphone or a mere phased combination of microphone signals to produce a narrow microphone pattern, as the beamformer uses the multiple microphones to separate spatially distinct acoustic noise/interference from a main beam signal corresponding to the desired acoustic source. However, due to the adaptive nature of the blocking matrix and the complexity of modeling the noise/interference, the responsiveness of the noise/interference reduction to changes in the noise/interference may be slow and inaccurate, in particular when the noise and/or interference levels are large relative to the desired signal.

Therefore, it would be advantageous to provide an improved adaptation performance in an adaptive beamformer employing an adaptive blocking matrix (ABM).

SUMMARY

Improved operation of an acoustic and other beamformers may be accomplished in a method, system and computer program product using digital signal processing to reduce interference and noise.

The method, system and computer program product implement an adaptive beam-forming array that has multiple sensors and that uses noise reference subtraction to reduce noise at an output of the adaptive beam-forming array. The methods, systems and computer program product determine a direction of arrival of energy from a desired source, determine an inter-sensor noise correlation between one or more pairs of sensors, generate a noise reference by an adaptive blocking matrix that estimates an inter-sensor model representing a relationship between desired signal components received from the desired source and that are present in signals from the one or more pairs of sensors. The noise reference is generated with an adaptive filter that filters a first signal from a first one in the pairs of the plurality of sensors and is combined with the second signal in the pairs sensors to produce the noise reference. The adaptive filter is initialized with an initialization response computed from the direction of arrival and the inter-sensor noise correlation. The sensors may be microphones or other acoustic input transistors, or may be another type of sensor that receives spatially distinct signals and interference.

The summary above is provided for brief explanation and does not restrict the scope of the Claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DESCRIPTION OF ILLUSTRATIVE EMBODIMENT

The present disclosure encompasses methods, systems and computer program-products that implement beamforming arrays with adaptive blocking matrices (ABMs). To improve convergence, the adaptive filter within each of the ABMs is initialized with a value computed from a detected direction of a desired signal source and an inter-sensor noise correlation value. The beam-forming systems according to embodiments of the disclosure encompass both two sensor small systems and larger multi-sensor arrays. The sensors may be acoustic sensors such as microphones, or may be another type of sensor that may receive energy propagated from a remote source, such as electromagnetic sensors.

Figure 1A:
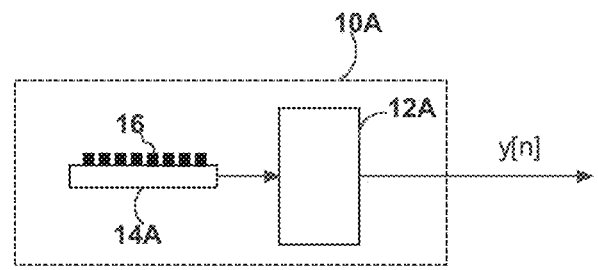
FIG. 1A is a block diagram of a sensor array system 10A in which techniques according to an embodiment of the present disclosure are practiced.

FIG. 1A shows a block diagram of a sensor array system 10A in accordance with an embodiment of the disclosure. Sensor array system includes a MEMS microphone array 14A comprising multiple microphone elements 16. A microelectromechanical system (MEMS) microphone array 14A has one or more outputs coupled to an adaptive beam forming system 12A that implements beamforming and noise reduction techniques as described in further detail below and provides as an output y[n], a noise-reduced main beam signal. While adaptive beamforming system 12A is shown separate from MEMS microphone array 14A, in most applications, a digital signal processing subsystem that implements adaptive beamforming system 12A will be integrated with MEMS microphone array 14A on a common die. The connection between multiple microphone elements 16 and adaptive beamforming system 12A thus does not require multiplexing, although multiplexed microphone input signals may be used with the embodiments of the disclosure described below, with proper time-alignment within the beamformer. Sensor array system 10A may be integrated in various systems that receive acoustic input, such as smart speakers, speakerphones, wireless telephones, voice assisted devices, or cordless telephones and the like.

Figure 1B:
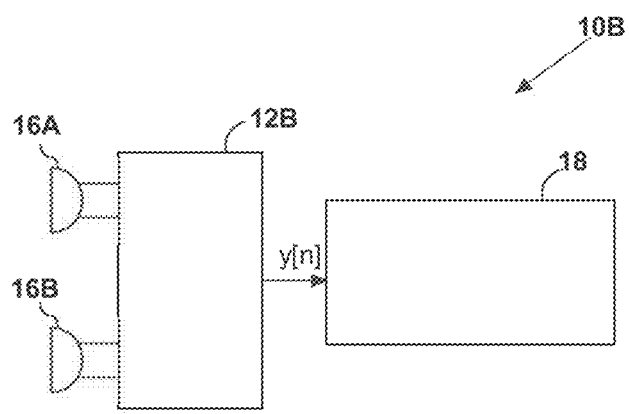
FIG. 1B is a block diagram of device 10B in which techniques according to an embodiment of the present disclosure are practiced.

FIG. 1B shows a block diagram of a device 10B in accordance with an embodiment of the disclosure, which may be a smart speaker, speakerphone, voice-assisted device, wireless or cordless telephone or another acoustic input device. A pair of microphones 16A, 16B provides input to an adaptive beamforming system 12B, which provides output signal y[n] to an interface 16, which may be a wired or wireless interface such as a wireless network connection for a mobile telephone provider connection, or a Wi-Fi network or BLUETOOTH wireless connection or universal serial bus (USB) connection for other devices. (BLUETOOTH is a registered trademark of BLUETOOTH SIG, INC.)

Figure 2A:
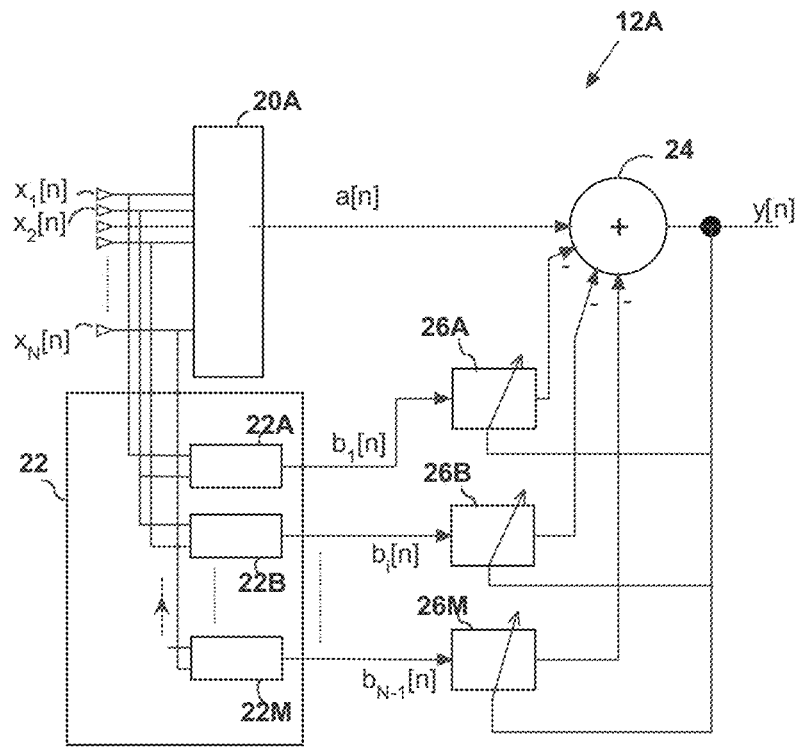
FIG. 2A is a block diagram of an adaptive beamforming array system 12A that may be included in sensor array system 10A of FIG. 1A.

Referring now to FIG. 2A, details of adaptive beamforming system 12A are shown. Adaptive beamforming system 12A is a generalized sidelobe canceler (GSC) that is implemented to remove noise and interference from a main beam signal containing speech or other information. Input signals $x_1[n] \ldots x_N[n]$ are received from microphone elements 16 and are combined in a fixed (non-adaptive) beamformer 20A, which may or may not be steerable via phase control of input signals $x_1[n] \ldots x_N[n]$ received from microphone elements 16 (FIG. 1A), but which provides main beam signal a[n] via which a desired signal is sensed and noise-reduced to generate output signal y[n]. To remove interference and other noise from main beam signal a[n], a combiner 24 subtracts the outputs of multiple blocking channels, each having an ABM 22A-22M and an adaptive filter 26A-26M connected in series. ABMs 22A-22M each receive a pair of input signals $x_1[n] \ldots x_N[n]$ from each adjacent pair of microphone elements 16 (FIG. 1A) and generate a corresponding blocking signal $b_1[n] \ldots b_{N-1}[n]$ that form a robust noise-canceler that removes interfering signals, noise and reverberation. and also compensates for variations in gain, phase and frequency response of microphone elements 16 (FIG. 1A), their associated signal paths, and other variations such as diffraction around microphone elements 16 (FIG. 1A) and their array. Adaptive filters 26A-26M adjust blocking signals $b_1[n] \ldots b_{N-1}[n]$ to minimize correlated residual components of $b_1[n] \ldots b_{N-1}[n]$ that are present in output a[n] of fixed beamformer 20A.

Figure 2B:
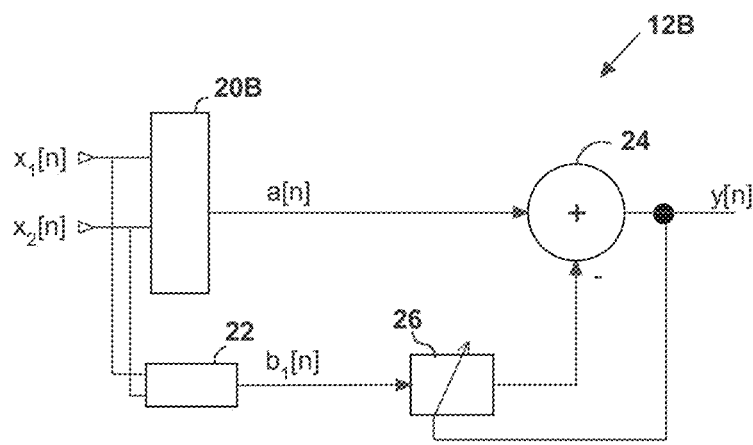
FIG. 2B is a block diagram of an adaptive beamforming array system 12B that may be included in device 10B of FIG. 1B.

Referring now to FIG. 2B, details of adaptive beamforming system 12B are shown. Adaptive beamforming system 12B is similar to adaptive beamforming system 12A, so only differences between them are described below. Input signals $x_1[n]$ and $x_2[n]$ are received from corresponding microphones 16A, 16B (FIG. 1B) and are combined in a fixed beamformer 20B as described above, and also provide input to a single ABM 22 that generates blocking signal $b_1$ and adaptive filter 26 forming a noise/interference canceling channel, the output of which is subtracted by combiner 24 from output a[n] of fixed beamformer 20B. Output y[n] from adaptive beamforming system 12B is then provided to a sink, such as a network interface controller 18 that can convey a representation of output y[n] to a remote location and/or perform local processing of output y[n], for example, to recognize audio segments likely to have speech content, which are then transmitted via a network for remote speech recognition.

Figure 3A:
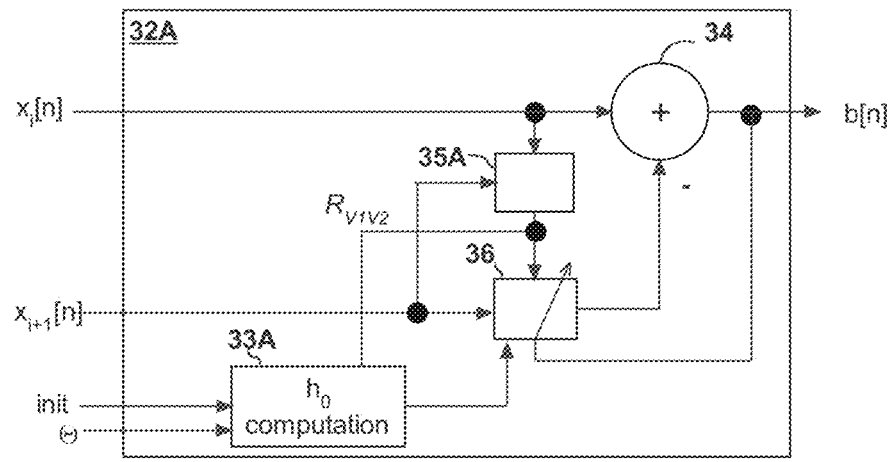
FIG. 3A is a block diagram illustrating details of an Adaptive Blocking Matrix (ABM) 32A that may be used to implement ABMs 22A in FIG. 2A and FIG. 2B.
Figure 4A:
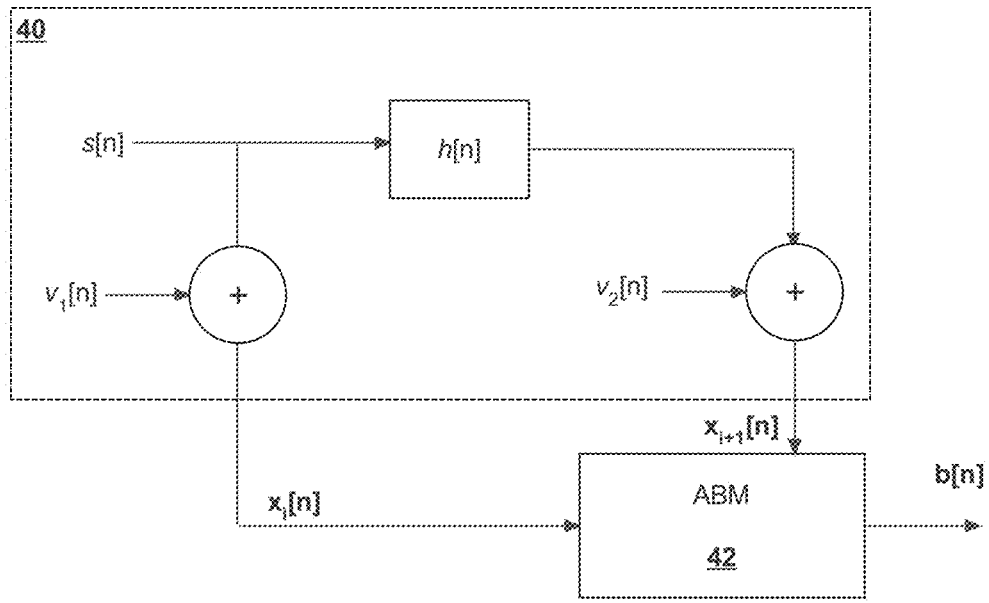
FIG. 4A is a block diagram depicting a system model including an ABM such as ABM 32A of FIG. 3A or ABM 32B of FIG. 3B.

Referring now to FIG. 3A, details of an ABM 32A that can be used to implement ABMs 22A-22M in FIG. 2A and ABM 22 in FIG. 2B are shown. ABM 32A is a robust blocking matrix in which the relationship between the desired signal components that are present in both of the inputs is modeled by a linear time-varying system. The linear model h[n] is estimated using an adaptive filter 36. The reverberation/diffraction effects and the frequency response of the microphone channels are all be subsumed in impulse response h[n]. By estimating the parameters of the linear model, the speech signal in one of the microphones and the filtered speech from the other microphone are closely matched in magnitude and phase by adaptive filter 36, greatly reducing the speech leakage in output signal b[n]. The output of adaptive filter 36 is subtracted from inputs signal $x_i[n]$ by a combiner 34, and adaptive filter 36 models the inter-sensor relationship between desired signal component s[n] in input signals $x_i[n]$ and $x_{i+1}[n]$ so that output blocking signal b[n] corresponds to the content of input signal $x_i[n]$ with the desired components removed. FIG. 4A shows a system model 40 "connected" to an ABM 42 such as ABM 32A illustrating the modeling of input signals $x_i[n]$ and $x_{i+1}[n]$ as a sum of desired signal and a noise component, $v_1[n]+s[n]$ and $v_2[n]+s[n]*h[n]$, respectively, where h[n] is the inter-sensor model between the sensors that provide input signals $x_i[n]$ and $x_{i+1}[n]$ and which is the response that is estimated by the adaptive filter in ABM 42. Input signal input $x_i[n]$ has the same desired component s[n] as signal $x_{i+1}[n]$ but in signal $x_{i+1}[n]$ desired signal s[n] is transformed by the actual system h[n], so that $x_i[n]=v_1[n]+s[n]$ and $x_{i+1}[n]=v_2[n]+s[n]*h[n]$, where * is the convolution operator and $v_1[n]$ and $v_2[n]$ are correlated interfering noise that may be present in the ambient audio and collected in signals $x_i[n]$, $x_{i+1}[n]$ in the discussion below.

The result of the operation of ABM 32A is that blocking signal(s) b[n] in the systems of FIG. 2A and FIG. 2B will remove only the undesired components from main beam signal y[n]. To accomplish the removal, adaptive filter 36 receives a measure of the cross-correlation between undesired components of input signal $x_i$ and input signal $x_{i+1}$ from a correlation block 35A that computes the cross-correlation $R_{v_2 v_1}$ of noise components, $v_1[n]$ and $v_2[n]$, which is the cross-correlation of the background noise in input signal $x_i$ and input signal $x_{i+1}$ and referred to herein as the inter-sensor noise correlation. The response of adaptive filter 36 is driven to remove all but the correlated noise components of $x_i$–$x_{i+1}$ to generate a suitable blocking signal b[n]. However, in high noise/interference environments, adaptive filter 36 may be very slow to converge on its own, i.e., when the update rate and/or step size of adaptive filter 36 is set too high, unstable operation due to low signal-to-noise ratio (SNR) will occur, and the compromise is to reduce the update rate and/or step size to achieve stable operation. Under such conditions, initializing adaptive filter 36 to a response that will reduce convergence time and likely lead to a stable convergence is desirable. An $h_0$ computation block 33A performs initialization of adaptive filter 36 by setting the initial response of adaptive filter 36, h[0], to a value based upon a measure of the inter-sensor noise correlation $R_{v_2 v_1}$ provided by correlation block 35A and a known direction of a source of desired signal in the main beam of the beamformer, i.e., the direction of the source of the desired signal in main beam signal output y[n]. The direction θ is generally available from a tracking algorithm that tracks the main beam source, and signal init which triggers initialization, is also generally provided from the tracking algorithm when a main beam source is first detected. Noise correlation block 35A only computes a new value for inter-sensor noise correlation $R_{v_1 v_1}$, only when informed by the noise presence tracking algorithm.

Figure 5:
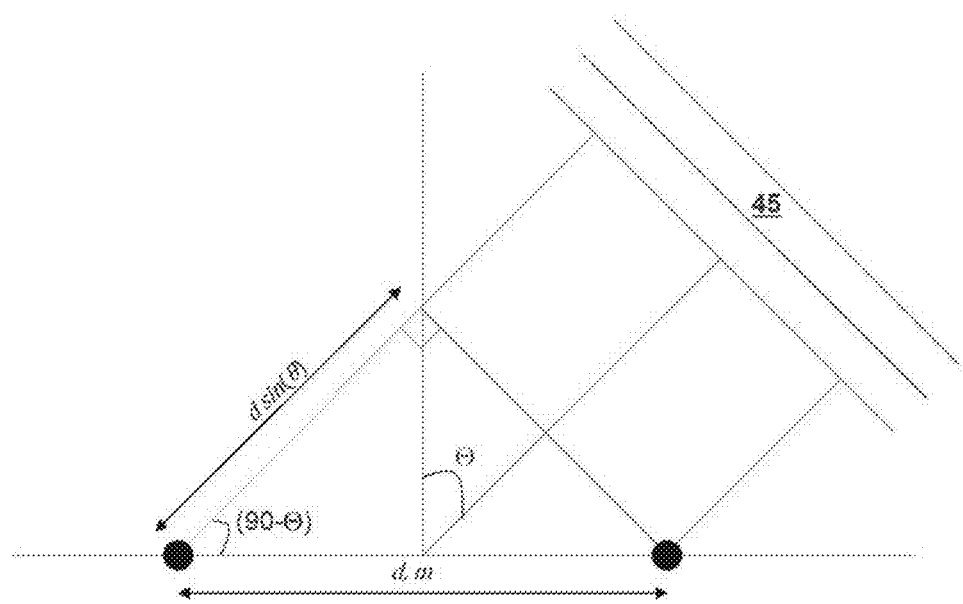
FIG. 5 is a pictorial diagram depicting arrival of acoustic waves at sensors within the systems of FIG. 1A and FIG. 1B.

Assuming far-field conditions, the initial coefficients of adaptive filter 36 may be set to account for the direct path part of inter-microphone impulse response. The reverberant part of the impulse response estimation may then be included via adaptation. Therefore, $h_0$ computation block 33A uses a free-field signal propagation model for the desired signal. In noisy conditions, the Minimal Mean Square Estimate (MMSE) solution is given by:

$$h_0 = (I + R_{ss}^{-1} R_{v_1 v_1})^{-1} h_{ff}$$

where $h_{ff}$ is the free-field inter microphone response for the desired main beam signal, and Rss and $R_{v1v2}$ are, respectively, the autocorrelation matrices of the desired speech signal and the background noise $v_1[n]$, $v_2[n]$ in input signals $x_i[n]$, $x_{i+1}[n]$ In order to avoid matrix inversion and assuming the noise is white noise, the bootstrapped filter coefficients are given by:

$$h_0 = \left(\frac{SNR_{ref}}{1 + SNR_{ref}}\right) h_{ff}$$

where $SNR_{ref}$ is the signal-to-noise ratio in the reference $x_i[n]$. The free-field inter-microphone response is derived analytically using the inter-microphone distance and the direction of arrival of the speech signal. As shown in FIG. 5, the time difference of arrival (in samples) between two microphones separated by d meters is given by $$n_d = \frac{d \sin(\theta)}{c F_s},$$

where θ is the direction of arrival of plane waves 45, c is the speed of sound and $F_s$ is the sampling frequency. The time delay $n_d$ in samples is not always an integer, so the free-field response may be written as:

$$h_{ff}[n] = \begin{cases} \delta[n - n_d], & n_d \text{ is integer} \\ \delta[n - \lfloor n_d \rfloor] * sinc(n - (n_d - \lfloor n_d \rfloor)), & \text{otherwise} \end{cases}$$

where $\lfloor n_d \rfloor$ is the integer part of the non-integer delay $$n_d, (n_d - \lfloor n_d \rfloor)$$

is the fractional part of $n_d$, and * is a convolution operator. The function $$sinc(n - (n_d - \lfloor n_d \rfloor))$$

is a sinc( ) function delayed by a fractional sample delay. The delayed function may be calculated using a Lagrange interpolator polynomial function.

Figure 3B:
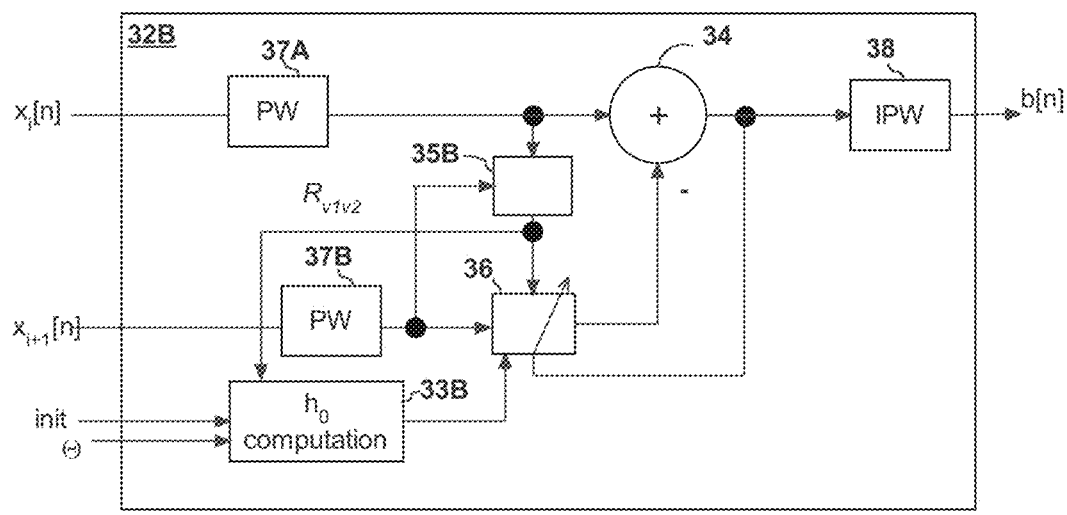
FIG. 3B is a block diagram illustrating details of another Adaptive Blocking Matrix (ABM) 32B that may be used to implement ABMs 22A in FIG. 2A and FIG. 2B.

Referring now to FIG. 3B, details of another ABM 32B that may be used to implement ABMs 22A-22M in FIG. 2A and ABM 22 in FIG. 2B are shown. ABM 32B is a robust blocking matrix with pre-whitening. The operation of ABM 32B is similar to that of ABM 32A of FIG. 3A, so only differences between them will be described below. Because adaptive filter 36 may model to either spatially- or temporally-correlated noise as mentioned above, pre-whitening (PW) filters 37A and 37B are provided to pre-whiten input signals $x_i[n]$, $x_{i+1}[n]$, as described in the above-incorporated Patents. An inverse pre-whitening filter 38 is provided to remove the effects of the pre-whitening on output blocking signal b[n]. When pre-whitening is employed, the initialization value computed by $h_0$ computation block 33B needs to be adjusted to compensate for the pre-whitened signals provided to a correlation block 35B and adaptive filter 36. Correlation block 35B computes the inter-sensor noise correlation $r_{v_2 v_1}$, seen in cross-product shorthand in the equations below, but for the pre-whitened signals in contrast to correlation block 35A in FIG. 3A. Again, assuming free-field propagation and assuming the relevant noise in input signals $x_i[n]$, $x_{i+1}[n]$ is white, an optimized initial response $h_0$ is given by:

$$h_0 = \frac{1}{(\sigma_s^2 + \sigma_v^2)}\left[I + \frac{\tilde{r}_{v_2 v_1} r_{v_2 v_1}^T}{(\sigma_s^2 + \sigma_v^2 - r_{v_2 v_1}^T \tilde{r}_{v_2 v_1})}\right](\sigma_s^2 h_{ff} - (\sigma_s^2 + \sigma_v^2 - 1/\varrho)\tilde{r}_{v_2 v_1}) =$$

$$\left(\frac{SNR}{1 + SNR}\right) h_{ff} - \left\{\left(\frac{SNR}{1 + SNR}\right) + \sigma_v^2\right\}\tilde{r}_{v_2 v_1} +$$

$$\frac{1}{(\sigma_s^2 + \sigma_v^2 - r_{v_2 v_1}^T \tilde{r}_{v_2 v_1})}\left[\left(\frac{SNR}{1 + SNR}\right)\tilde{r}_{v_2 v_1} r_{v_2 v_1}^T h_{ff} - \right.$$

$$\left.\left\{\left(\frac{SNR}{1 + SNR}\right) + \sigma_v^2\right\}\tilde{r}_{v_2 v_1} r_{v_2 v_1}^T \tilde{r}_{v_2 v_1}\right]$$

Where $$\tilde{r}_{v_2 v_1} = r_{v_2 v_1} / \varrho$$

is the normalized noise correlation and $\varrho$ is tuning parameter that is set as a function of noise energy $\sigma_v^2$, as described in U.S. Pat. No. 9,607,603, which is incorporated herein by reference in its entirety. Where $\sigma_s^2$ is the signal energy of microphone signal $x_i[n]$, $\sigma_v^2$ is the noise energy, which is assumed to be the same in both microphone signals of a pair. The variance (energy) of signal $\tilde{\sigma}_v^2 = (\sigma_v^2 - 1/\varrho)/(\sigma_s^2 + \sigma_v^2)$ is the difference in the noise correlation normalization factor normalized by $(\sigma_s^2 + \sigma_v^2)$, $SNR = \sigma_s^2/\sigma_v^2$ is the signal to noise ratio in the reference signal $x_1[n]$, i.e., the ratio of the signal energy $\sigma_s^2$ to the noise energy $\sigma_v^2$, and $r_{v_2 v_1}^T$ is the transpose of the inter-sensor noise correlation $r_{v_2 v_1}$. Optimized initial response $h_0$ may be expressed as:

$$h_0 = \left(\frac{SNR}{1+SNR}\right) h_{ff} - \left\{\left(\frac{SNR}{1+SNR}\right) + \sigma_v^2\right\} \tilde{r}_{v_2 v_1} + \frac{\tilde{r}_{v_2 v_1}}{(\sigma_s^2 + \sigma_v^2 - r_{v_2 v_1}^T \tilde{r}_{v_2 v_1})} \left[\left(\frac{SNR}{1+SNR}\right) r_{v_2 v_1}^T h_{ff} - \left\{\left(\frac{SNR}{1+SNR}\right) + \sigma_v^2\right\} r_{v_2 v_1}^T \tilde{r}_{v_2 v_1}\right]$$

If $r_{v_2 v_1}$ and $h_{ff}$ are assumed to be orthogonal to each other, then:

$$h_0 = \left(\frac{SNR}{1+SNR}\right) h_{ff} - \left\{\left(\frac{SNR}{1+SNR}\right) + \sigma_v^2\right\} \tilde{r}_{v_2 v_1} - \frac{r_{v_2 v_1}^T \tilde{r}_{v_2 v_1} \left\{\left(\frac{SNR}{1+SNR}\right) + \sigma_v^2\right\} \tilde{r}_{v_2 v_1}}{(\sigma_s^2 + \sigma_v^2 - r_{v_2 v_1}^T \tilde{r}_{v_2 v_1})}$$

The term $$\left[\left\{\left(\frac{SNR}{1+SNR}\right) + \sigma_v^2\right\} r_{v_2 v_1}^T \tilde{r}_{v_2 v_1}\right]$$

is a scalar component. Therefore, the optimized coefficient may be written in a simpler form as $$h_0 = \left(\frac{SNR}{1+SNR}\right) h_{ff} - \xi \tilde{r}_{v_2 v_1}$$

where the scalar $\xi$ is given by $$\xi = \left\{\left(\frac{SNR}{1+SNR}\right) + \sigma_v^2\right\} + \frac{\left\{\left(\frac{SNR}{1+SNR}\right) + \sigma_v^2\right\} r_{v_2 v_1}^T \tilde{r}_{v_2 v_1}}{(\sigma_s^2 + \sigma_v^2 - r_{v_2 v_1}^T \tilde{r}_{v_2 v_1})}$$

If the dot product between the normalized and unnormalized cross-correlations is negligible, then $$h_0 \approx \left(\frac{SNR}{1+SNR}\right) h_{ff} - \left\{\left(\frac{SNR}{1+SNR}\right) + \sigma_v^2\right\} \tilde{r}_{v_2 v_1}$$

which may be computed from existing values. The first term is the initialization value $h_0$ for the spatially non-pre-whitened ABM 32A of FIG. 3A and the second term represents an adjustment for the spatially pre-whitened conditions in ABM 32B of FIG. 3B.

Figure 4B:
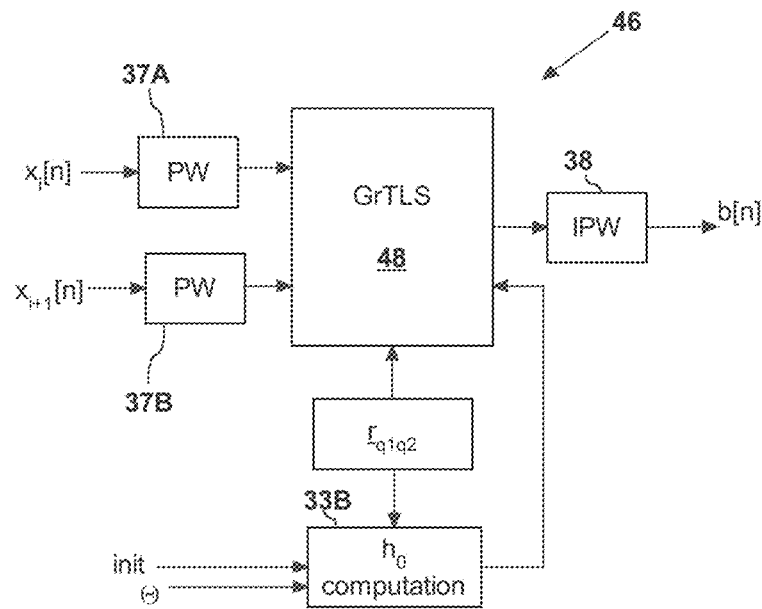
FIG. 4B is a block diagram depicting a system that may be included in sensor array system 10A of FIG. 1A or sensor array system 10B of FIG. 1B.

FIG. 4B shows a system 46 in accordance with an embodiment of the disclosure, which is a simplified and specific implementation of ABM 32B of FIG. 3B. A gradient-descent total-least-squares (GrTLS) adaptive processor 48 receives pre-whitened sensor input signals $x_i[n]$, $x_{i+1}[n]$ from outputs of pre-whitening (PW) blocks 37A, 37B and performs adaptive beamforming as described above to generate an output signal that is provided to the input of inverse pre-whitening (IPW) block 38. $h_0$ computation block 33B receives initialization control signal init and direction-of-arrival $\theta$, as well as inter-sensor noise correlation value $r_{v1v2}$ from correlation block 35B, and initializes the adaptive filter in (GrTLS) adaptive processor 48 when initialization control sign init is asserted, which is generally when the desired main beam signal is absent.

Figure 6:
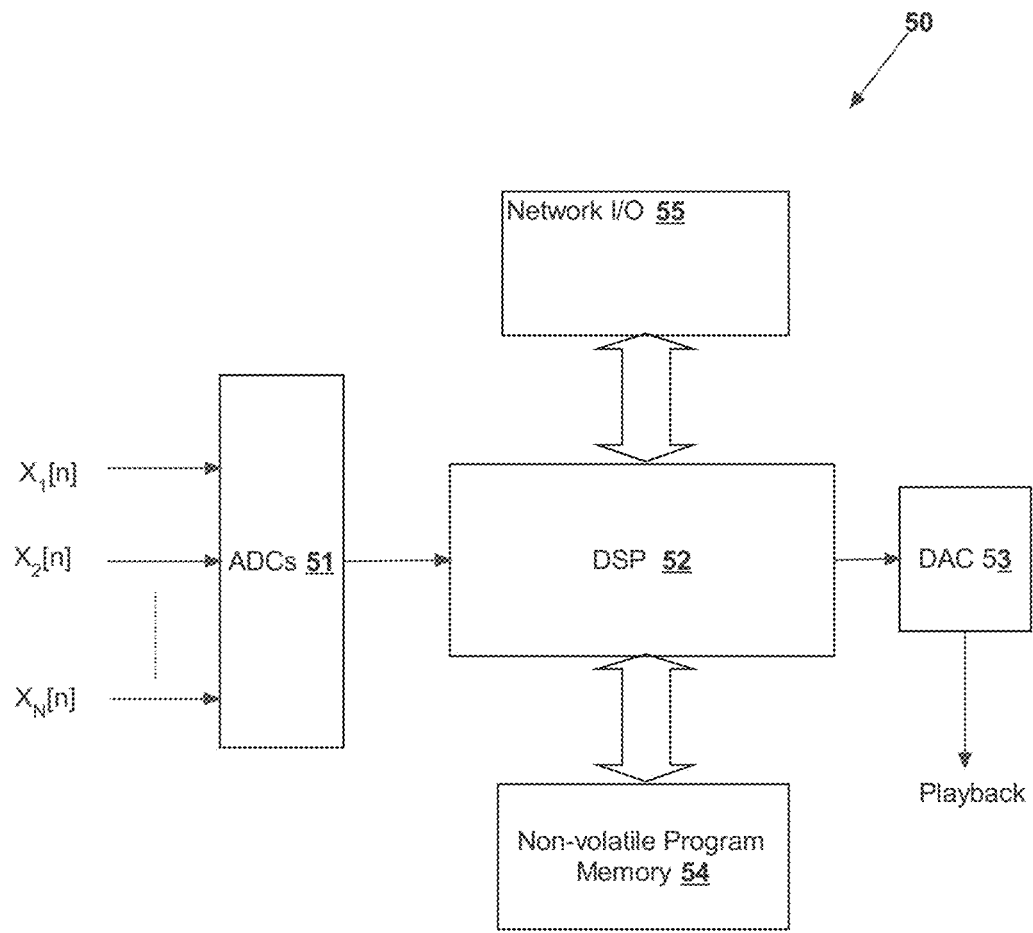
FIG. 6 is a block diagram of a digital signal processing system 50 in which techniques according to an embodiment of the present disclosure are practiced.

Referring now to FIG. 6, a digital signal processing system is shown, which may be used to implement the techniques of the present disclosure. A digital signal processor (DSP) 52 (or a suitable general-purpose processor) executes program instructions stored in a non-volatile memory 54 and that form a computer-program product in accordance with the present disclosure. A network I/O block 55 provides connections such as those described above for network interface 18 of FIG. 1B. An analog-to-digital converter (ADC) 51 receives microphone signals $x_1$-$x_N$ and provides samples $x_1[n]$-$x_N[n]$ of the values of microphone signals $x_1$-$x_N$ to DSP 52. An optional digital-to-analog converter 53 generates any required playback signal (remote content such as speech or music) at output Playback from values received from network I/O block 55, and which is generally amplified and reproduced by a loudspeaker (not shown). The output of the beamformer implemented by the program product executed by DSP 52 may be sent to a remote location by network I/O block 55 for reproduction at a remote endpoint, which may be a remote telephone receiver or a speech recognition server.

Figure 7:
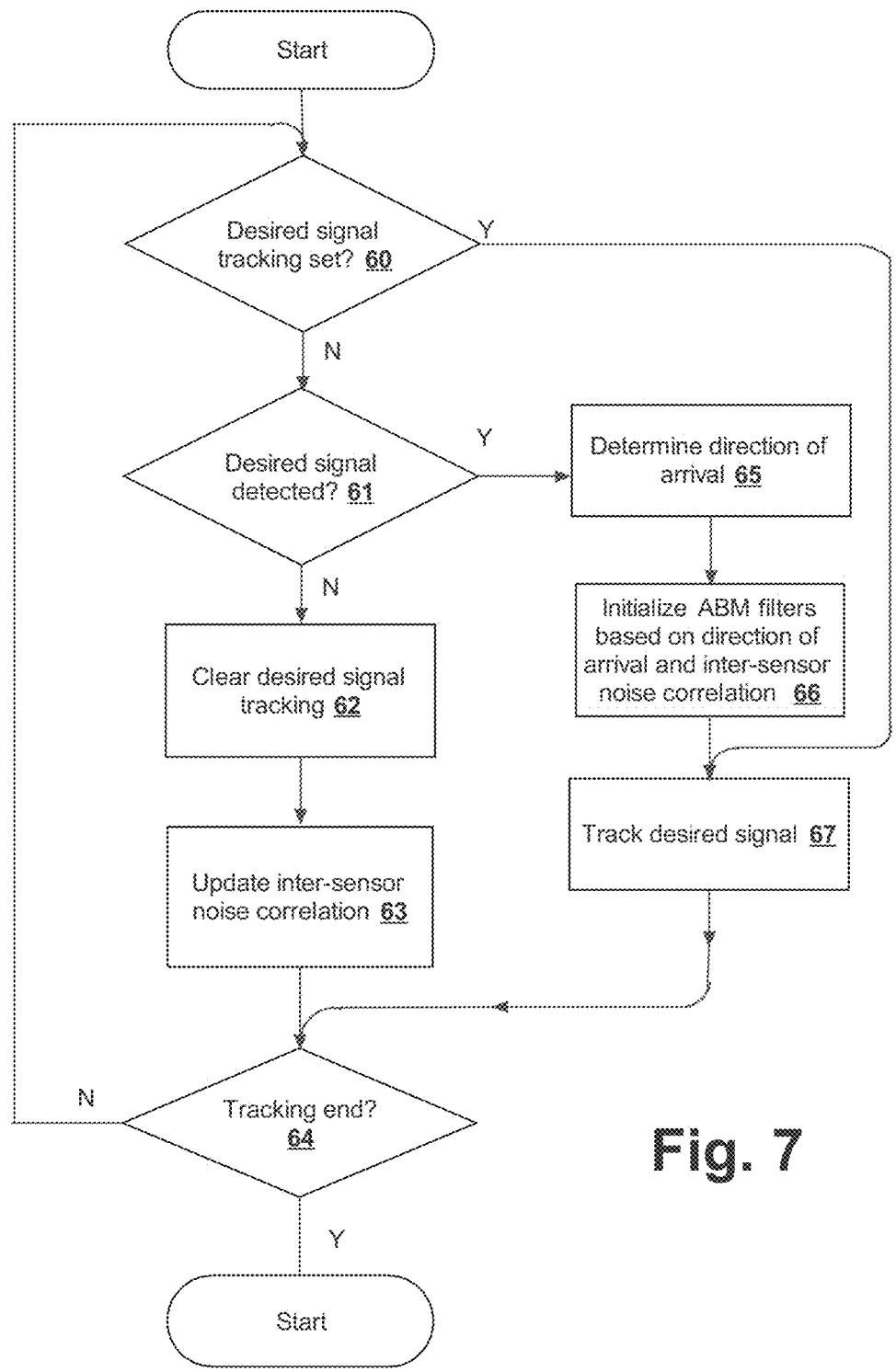
FIG. 7 is a flowchart depicting a method according to an embodiment of the present disclosure.

Referring now to FIG. 7, an example flowchart is shown that illustrates a method of processing sensor array signals disclosed herein and which is embodied in the instructions of the computer program product stored in non-volatile memory 54 of FIG. 5. If a desired signal is being tracked (decision 60), the process continues to track the desired signal (step 67). If the desired signal has just been detected (decision 61), then the direction-of-arrival of the main beam signal is determined (step 65), the ABM filters are initialized based on the direction-of-arrival and the current inter-sensor noise correlation (step 66) and the desired signal is tracked (step 67). If the desired signal is not detected (decision 61), then tracking is cleared if set (step 62) and the inter-sensor noise correlation values may be updated (step 63). Until the tracking algorithm is ended (decision 64), the process of steps 61-67 is repeated.

Figure 8:
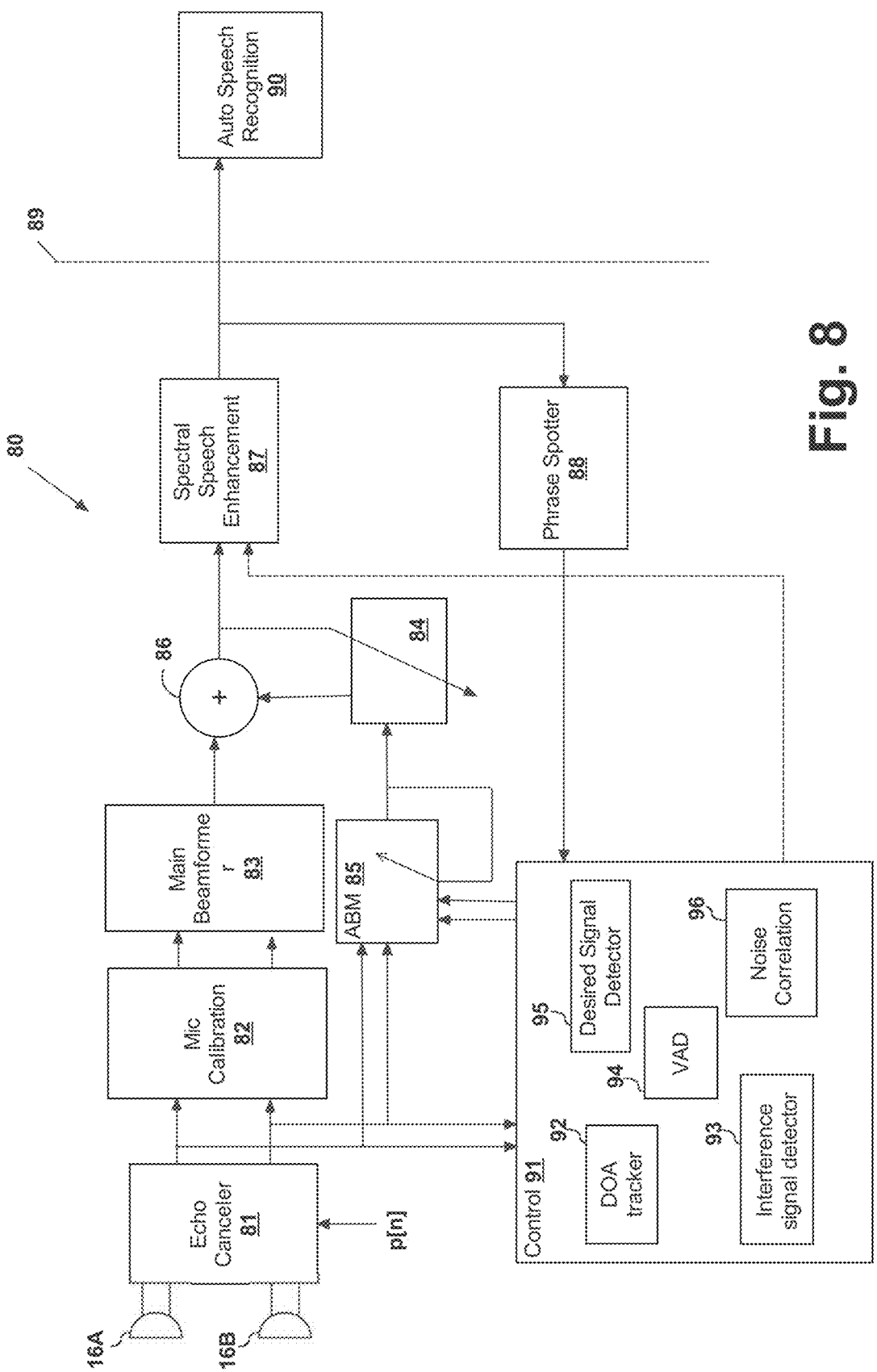
FIG. 8 is a block diagram depicting a system in which an ABM according to the embodiments of the present disclosure may be included.

Referring now to FIG. 8, an example signal processing system 80 is shown, in which an ABM according to the above-described embodiments of the disclosure may be included. An echo-canceler 81 receives microphone signals from microphones 16A, 16B and removes reverberant and direct energy caused by a playback signal p[n] that is being reproduced in the room where microphones 16A, 16B are located. A microphone calibration block 82 adjusts amplitude of signals from microphones 16A, 16B to equalize the microphone signals before they are provided to main beamformer 83. As described above, an ABM 85 generates a blocking signal that is adaptively filtered by an adaptive filter 84 to remove uncorrelated noise from the blocking signal, which is then subtracted from the output of main beamformer 83 to generate a noise-reduced output signal that is then further processed by a spectral/speech enhancement block 87, which optimizes the noise-reduced main beam output signal for speech recognition. A phase spotter 88 triggers on trigger phrases that are either learned by system 80 or are predetermined trigger words or phrases as used by various voice-activated consumer devices distributed or sold by service providers. A control block 91 illustrates the various operations used by the above-described systems and in system 80, including a direction of arrival (DOA) tracker 92 that tracks the DOA of the main beam signal as described above, and a voice activity detector (VAD) 94 that determines when one or both microphones 16A, 16B are receiving speech. Control block 91 also includes an interference signal detector 93 that determines when microphones 16A, 16B are receiving signal from an interfering source, a desired signal detector 95 that determines when microphones 16A, 16B are receiving signal from a desired source (e.g., speech directed at) microphones 16A, 16B, and the noise correlation 96 computations as described above. The blocks to the left of a boundary 89 shown in the right hand side of FIG. 8 are generally an always-on low power system 80, while the output of spectral/speech enhancement block 87 are transmitted to the right hand side of boundary 89 to an automatic speech recognition block 90, which may be remotely located at a server reached through wired or wireless means, or which alternatively may be located in a device that includes system 80 or a connected device, such as a general-purpose computer connected via a wired interface such as USB or a wireless interface such as a BLUETOOTH interface.

Figure 9A:
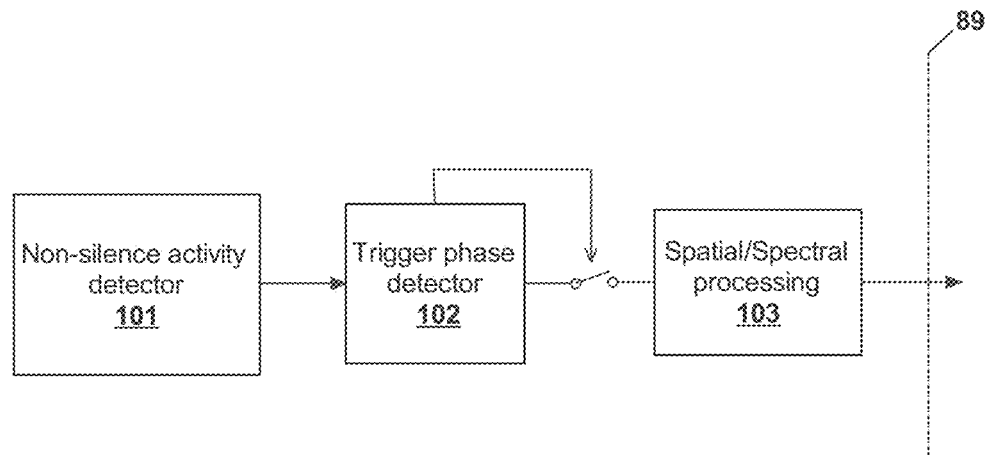
FIG. 9A is a block diagram depicting a control state flow in the system of FIG. 8.
Figure 9B:
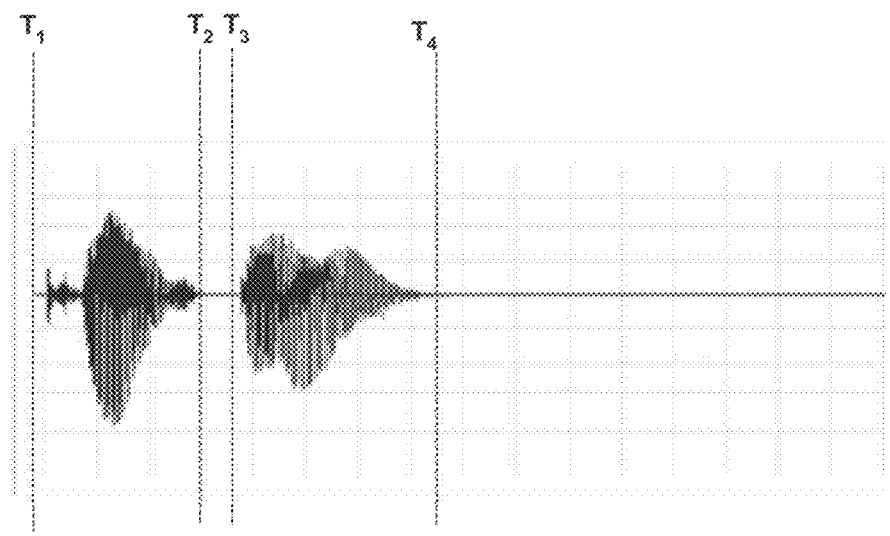
FIG. 9B is a waveform graph depicting a sequence of control phases in the system of FIG. 9A.

Referring now to FIG. 9A, an example control state flow in signal processing system 80 of FIG. 8 is shown. A non-silence activity detector 101 detects when activity, which may be a desired signal or an interfering signal is present in signals received from multiple sensors such as MEMS microphone array 14A of FIG. 1A or microphones 16A, 16B of FIG. 1B. A trigger phrase detector 102 determines when the output of the signal processing systems described above is sent to spatial/spectral processing 103 for further communication across boundary 89. FIG. 9B is a waveform graph of received microphone signals for illustrating a sequence of control phases in the process of FIG. 9A. Between times $T_1$ and $T_2$, non-silence activity detector 101 determines that there is activity and trigger phrase detector 102 determines that a trigger phrase is present. Once the phrase is spotted, the DOA of the desired speech is detected in the time interval $[T_1\ T_2]$ from the buffered data. Between times $T_2$ and $T_3$, when non-silence activity detector 101 determines that there is no activity, the inter-sensor noise correlation is updated. Between times $T_3$ and $T_4$, when non-silence activity detector 101 determines that there is again activity, signal pre-processing natural language processing may be performed to recognize commands and other information received by the system.

Figure 10:
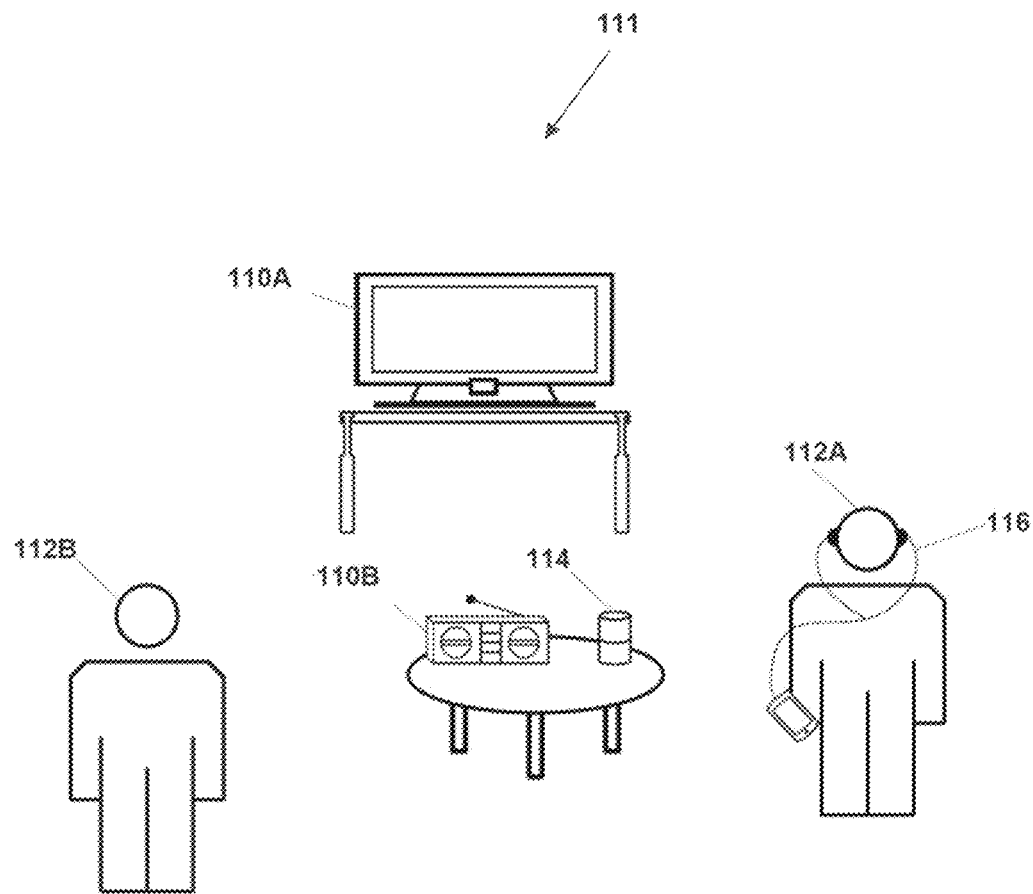
FIG. 10 is a pictorial diagram depicting a room 111 in which smart home devices implementing systems and methods according to embodiments of the disclosure are located.

FIG. 10 shows a room 111 in which smart home devices according to the above-described embodiments of the disclosure are located. A smart home device is an electronic device configured to receive user speech input, process the speech input, and perform an action in response to a voice command recognized in the speech input. In one example, room 111 may include a smart speaker 114 in which the above-described techniques are implemented. Smart speaker 114 may include two or more microphones, a speaker, and a speech processing system that receives input from the microphones. Users 112A and 112B are shown in room 111 and may be communicating with each other or speaking to smart speaker 114. Users 112A and 112B will generally be mobile in the room, and taking actions that change the acoustic characteristics such as moving their heads, turning away from smart speaker 114, obscuring their mouths with hands or arms, or performing other movements that alters the reception of their speech by smart speaker 114. Sources of noise or other interference received as audio signals by the microphones of smart speaker 114 that should not activate the smart speaker 114 or that interfere with reception of speech from users 112A and 112B, may be present in room 111. Example interference sources in room 111 may be sounds from a portable radio/media player 110B or sounds from a television 110A. Other sources of interference not illustrated may include noises from fixed and portable appliances used in room 111 an adjacent space, including washing machines, dish washers, sinks, vacuum cleaners, microwave ovens, music playback systems, and the like.

In example room 111, smart speaker 114 includes a speech processing system in accordance with one or more of the above-described embodiments, for example, signal processing system 80 of FIG. 8. Without initialization of ABM 85 in signal processing system 80 according to the above described methods, smart speaker 114 may fail to recognize voice commands or may erroneously recognize noise or interference as a voice command because ABM 85 does not converge quickly enough to remove the noise/interference. By initializing ABM 85 according to the above-described techniques, smart speaker 114 is better able to remove the interfering noise signals and noise as voice commands arrive, or as interference or noise from an interfering source that might otherwise trigger a voice command occurs. Smart speaker 114 also is generally packaged in a small profile, which reduces the maximum spacing that may be provided between the microphones, which may reduce the ability to distinguish interfering sources within a given processing time for a fixed signal processing capability. Initializing ABM 85 according to the above-described techniques aids in improvement of the effectiveness of the processing in the limited time that may be available to distinguish an interfering trigger from a desired trigger.

Example room also contains a personal device 116, which may be a headset, a wearable device (e.g., a watch or smart glasses), a tablet, laptop or mobile device, such as a wireless telephone. Personal device 116 includes two or more microphones, a speaker, and a speech processing system that receives input from the microphones. Personal device 116 includes a speech processing system in accordance with one or more of the above-described embodiments, for example, signal processing system 80 of FIG. 8. Without initialization of ABM 85 in signal processing system 80 according to the above described methods, personal device 116 may not effectively distinguish near speech of user 112A from speech of user 112B or noise/interference from other devices as described above for smart speaker 114. Without the initialization of ABM 85 in system 80 of FIG. 8, personal device 116 may fail to recognize voice commands or may erroneously recognize noise or interference as a voice command because ABM 85 does not converge quickly enough to remove the noise/interference. By initializing ABM 85 according to the above-described techniques, personal device 116 is better able to remove the interfering noise signals and noise as voice commands arrive, or as interference or noise from an interfering source that might otherwise trigger a voice command occurs. Personal device 116 also is generally packaged in a small profile, which reduces the maximum spacing that may be provided between the microphones, which may reduce the ability to distinguish interfering sources within a given processing time for a fixed signal processing capability. Initializing ABM 85 according to the above-described techniques aids in improvement of the effectiveness of the processing in the limited time that may be available to distinguish an interfering trigger from a desired trigger.

As mentioned above portions or all of the disclosed process may be carried out by the execution of a collection of program instructions forming a computer program product stored on a non-volatile memory, but that also exist outside of the non-volatile memory in tangible forms of storage forming a computer-readable storage medium. The computer-readable storage medium may be, for example, but is not limited to, an electronic storage device, a magnetic storage device, an optical storage device, an electromagnetic storage device, a semiconductor storage device, or any suitable combination of the foregoing. Specific examples of the computer-readable storage medium include the following: a hard disk, semiconductor volatile and non-volatile memory devices, a portable compact disc read-only memory (CD-ROM) or a digital versatile disk (DVD), a memory stick, a floppy disk or other suitable storage device not specifically enumerated. A computer-readable storage medium, as used herein, is not to be construed as being transitory signals, such as transmission line or radio waves or electrical signals transmitted through a wire. It is understood that blocks of the block diagrams described above may be implemented by computer-readable program instructions. These computer readable program instructions may also be stored in other storage forms as mentioned above and may be downloaded into a non-volatile memory for execution therefrom. However, the collection of instructions stored on media other than the system non-volatile memory described above also form a computer program product that is an article of manufacture including instructions which implement aspects of the function/act specified in the block diagram block or blocks.

In summary, the instant disclosure discloses a method, system and computer-program product that of operate a beam-forming array having a plurality of sensors, using noise reference subtraction to reduce noise at an output of the adaptive beam-forming array. The method, system and computer-program product determine a direction of arrival at the beam-forming array of energy from a desired source being measured by the beam-forming array, determine an inter-sensor noise correlation between at least one pair of the plurality of sensors, generate a noise reference with an adaptive blocking matrix that estimates an inter-sensor model representing a relationship between desired signal components received from the desired source and that are present in signals from at least one pair of the plurality of sensors. The noise reference is generated with an adaptive filter that filters a first signal from a first one of the at least one pair of sensors. The adaptive blocking matrix combines an output of the adaptive filter with a second signal from a second one of the at least one pair of the plurality of sensors to produce the noise reference. The adaptive filter is initialized with an initialization response computed from the direction of arrival and the inter-sensor noise correlation.

The method system and computer program-product may also pre-whiten the first and second signals with a pre-whitening response and apply an inverse of the pre-whitening response to the noise reference. The initialization response may be computed by adding a free-field response of the beamforming array for the direction of arrival to a measure of a weighted correlation of noise between the signals from the at one pair of the plurality of sensors. The measure of the correlation of noise may be estimated as a weighted covariance of the signals from the at least one pair of the plurality of sensors. The method, system and computer program-product may further detect whether or not the desired source is present in the signals from at least one pair of the plurality of sensors and in response to detecting that the desired source is absent, further detect that an interfering signal is present in the signals from at least one pair of the plurality of sensors. The determination of the inter-sensor noise correlation may be performed in response to detecting that the interfering signal is present and detecting that the desired source is absent. The determining of the inter-sensor noise correlation may be performed continuously so that time variation of the inter-sensor noise correlation is tracked. The method, system and computer-program product may further continuously update parameters of the adaptive blocking matrix using updated inter-sensor noise correlation values responsive to detecting that the desired source is present. The method, system and computer-program product may generate a main beam signal from one or more of the signals from at least one pair of the plurality of sensors, adaptively filter the noise reference with a second adaptive filter generate a filtered noise reference, subtract the filtered noise reference from the main beam signal to generate a noise-reduced output of the beam-forming array, and control the second adaptive filter to minimize components of the filtered noise reference that are uncorrelated with noise in the main beam signal. The generating of the main beam signal may comprise selecting one of the plurality of sensors as a selected sensor, and using a selected one of the signals from at least one pair of the plurality of sensors that originates from the selected sensor as the main beam signal. The plurality of sensors may be a plurality of microphones and the beam-forming array is an acoustic beamformer.

While the disclosure has shown and described particular embodiments of the techniques disclosed herein, it will be understood by those skilled in the art that the foregoing and other changes in form, and details may be made therein without departing from the spirit and scope of the disclosure. For example, the techniques of the disclosed embodiments may be used with electromagnetic or ultrasonic sensor arrays.

What is claimed is:

1. A method of operating a beam-forming array that uses noise reference subtraction to reduce noise at an output of the adaptive beam-forming array, the method comprising:
 determining a direction of arrival at the beam-forming array of energy from a desired source being measured by the beam-forming array, wherein the beamforming array comprises a plurality of sensors;
 determining an inter-sensor noise correlation between at least one pair of the plurality of sensors;
 generating a noise reference by an adaptive blocking matrix that estimates an inter-sensor model representing a relationship between desired signal components received from the desired source and that are present in signals from at least one pair of the plurality of sensors, wherein the noise reference is generated with an adaptive filter that filters a first signal from a first one of the at least one pair of the plurality of sensors, wherein the adaptive blocking matrix combines an output of the adaptive filter with a second signal from a second one of the at least one pair of the plurality of sensors to produce the noise reference; and initializing the adaptive filter with an initialization response computed from the direction of arrival and the inter-sensor noise correlation.

2. The method of claim 1, further comprising:
pre-whitening the first and second signals with a pre-whitening response; and
applying an inverse of the pre-whitening response to the noise reference.

3. The method of claim 1, wherein the initialization response is computed by adding a free-field response of the beamforming array for the direction of arrival to a measure of a weighted correlation of noise between the signals from the at one pair of the plurality of sensors.

4. The method of claim 3, wherein the measure of the correlation of noise is estimated as a weighted covariance of the signals from the at least one pair of the plurality of sensors.

5. The method of claim 1, further comprising detecting whether or not the desired source is present in the signals from at least one pair of the plurality of sensors.

6. The method of claim 5, wherein the detecting whether or not the desired source is present from the desired signal components detects that the desired source is absent, and further comprising detecting that an interfering signal is present in the signals from at least one pair of the plurality of sensors.

7. The method of claim 6, wherein the determining an inter-sensor noise correlation between at least one pair of the plurality of sensors is performed in response to detecting that the interfering signal is present.

8. The method of claim 7, wherein the determining an inter-sensor noise correlation is performed continuously so that time variation of the inter-sensor noise correlation is tracked.

9. The method of claim 8, further comprising responsive to detecting that the desired source is present, continuously updating parameters of the adaptive blocking matrix using updated inter-sensor noise correlation values.

10. The method of claim 1, further comprising:
generating a main beam signal from one or more of the signals from at least one pair of the plurality of sensors;
adaptively filtering the noise reference with a second adaptive filter to generate a filtered noise reference; and
subtracting the filtered noise reference from the main beam signal to generate a noise-reduced output of the beam-forming array, and controlling the second adaptive filter to minimize components of the filtered noise reference that are uncorrelated with noise in the main beam signal.

11. The method of claim 10, wherein the generating a main beam signal comprises:
selecting one of the plurality of sensors as a selected sensor; and
using a selected one of the signals from at least one pair of the plurality of sensors that originates from the selected sensor as the main beam signal.

12. The method of claim 10, further comprising:
pre-whitening the first and second signals with a pre-whitening response; and pre-whitening the first and second signals with a pre-whitening response; and
applying an inverse of the pre-whitening response to the noise reference to generate a de-whitened noise reference, and wherein the
adaptively filtering filters the de-whitened noise reference with the second adaptive filter to generate the filtered noise reference.

13. The method of claim 1, wherein the plurality of sensors is a plurality of microphones and the beam-forming array is an acoustic beamformer.

14. The method of claim 1, wherein the noise reference is generated with an adaptive filter in which the adaptation is controlled by a gradient descent total least-squares (GdTLS) coefficient control.

15. A system implementing a beam-forming array that uses noise reference subtraction to reduce noise at an output of the adaptive beam-forming array, the system comprising:
a plurality of sensors forming a sensor array;
a digital signal processor for executing program instructions;
an analog-to-digital converter for converting signals from the plurality of sensors to digital samples provided to the digital signal processor;
a memory for storing the program instructions;
program instructions stored in the memory that determine a direction of arrival at the beam-forming array of energy from a desired source being measured by the beam-forming array;
program instructions stored in the memory that determine an inter-sensor noise correlation between at least one pair of the plurality of sensors;
an adaptive blocking matrix that generates a noise reference by estimating an inter-sensor model representing a relationship between desired signal components received from the desired source and that are present in signals from at least one pair of the plurality of sensors, and comprising a first adaptive filter that filters a first signal from a first one of the at least one pair of the plurality of sensors to generate the noise reference, wherein the adaptive blocking matrix further comprises a combiner that combines an output of the first adaptive filter with a second signal from a second one of the at least one pair of the plurality of sensors to produce the noise reference; and
program instructions stored in the memory that initialize the first adaptive filter with an initialization response computed from the direction of arrival and the inter-sensor noise correlation.

16. The system of claim 15, wherein the adaptive blocking matrix comprises program instructions stored in the memory that implement the first adaptive filter and the combiner.

17. The system of claim 15, further comprising:
a whitening block that pre-whitens the first and second signals with a pre-whitening response;
an inverse pre-whitening block that applies an inverse of the pre-whitening response to the noise reference, and wherein the program instructions that initialize the first adaptive filter to compute the initialization response by adding a free-field response of the beamforming array for the direction of arrival to a measure of a weighted correlation of noise between the signals from the at one pair of the plurality of sensors, wherein the measure of the correlation of noise is estimated as a weighted covariance of the signals from the at least one pair of the plurality of sensors.

18. The system of claim 17, further comprising program instructions stored in the memory that detect whether or not the desired source is present in the signals from at least one pair of the plurality of sensors, and responsive to determining that the desired source is absent detect whether an interfering signal is present in the signals from at least one pair of the plurality of sensors, wherein the program instructions that determine an inter-sensor noise correlation between at least one pair of the plurality of sensors are executed in response to detecting that the desired source is absent, wherein the determining of the inter-sensor noise correlation is performed continuously so that time variation of the inter-sensor noise correlation is tracked, and wherein the program instructions further comprise program instructions stored in the memory that, responsive to the program instructions that detect whether or not the desired source is present having detected that the desired source is present, continuously update parameters of the adaptive blocking matrix using updated inter-sensor noise correlation values.

19. The system of claim 15, further comprising:
program instructions stored in the memory that generate
a main beam signal from one or more of the signals from at least one pair of the plurality of sensors;
a second adaptive filter that adaptively filters the noise reference with a second adaptive filter to generate a filtered noise reference; and
a combiner that subtracts the filtered noise reference from the main beam signal to generate a noise-reduced output of the beam-forming array, and controls the second first adaptive filter to minimize components of the filtered noise reference that are uncorrelated with noise in the main beam signal.

20. The system of claim 15, wherein the plurality of sensors is a plurality of microphones and the beam-forming array is an acoustic beamformer.

21. A computer program-product comprising a storage media that is not a signal or propagating wave, the storage media storing program instructions for execution by a digital signal processor that implement a beam-forming array receiving samples of signals from a plurality of sensors, the program instructions comprising program instructions that determine a direction of arrival at the beam-forming array of energy from a desired source being measured by the beam-forming array, determine an inter-sensor noise correlation between at least one pair of the plurality of sensors, implement an adaptive blocking matrix that generates a noise reference by estimating an inter-sensor model representing a relationship between desired signal components received from the desired source and that are present in the signals from at least one pair of the plurality of sensors, implement an adaptive filter that filters a first signal from a first one of the at least one pair of the plurality of sensors to generate the noise reference, and implement a combiner that combines an output of the adaptive filter with a second signal from a second one of the at least one pair of the plurality of sensors to produce the noise reference, and program instructions that initialize the adaptive filter with an initialization response computed from the direction of arrival and the inter-sensor noise correlation.

22. The computer program product of claim 21, further comprising
program instructions that pre-whiten the first and second signals with a pre-whitening response;
program instructions that that apply an inverse of the pre-whitening response to the noise reference, and wherein the program instructions that initialize the first adaptive filter compute the initialization response by adding a free-field response of the beamforming array for the direction of arrival to a measure of a weighted correlation of noise between the signals from the at least one pair of the plurality of sensors, wherein the measure of the correlation of noise is estimated as a weighted covariance of the signals from the at least one pair of the plurality of sensors.

23. The computer program product of claim 22, further comprising program instructions that detect whether or not the desired source is present in the signals from at least one pair of the plurality of sensors, and responsive to determining that the desired source is absent, detect whether an interfering signal is present in the signals from at least one pair of the plurality of sensors, wherein the program instructions that determine an inter-sensor noise correlation between at least one pair of the plurality of sensors are executed in response to detecting that the desired source is absent, wherein the determining of the inter-sensor noise correlation is performed continuously so that time variation of the inter-sensor noise correlation is tracked, and wherein the program instructions further comprise program instructions stored in the memory that, responsive to the program instructions that detect whether or not the desired source is present having detected that the desired source is present, continuously update parameters of the adaptive blocking matrix using updated inter-sensor noise correlation values.

24. The computer program product of claim 22, further comprising:
program instructions that generate a main beam signal from one of more of the signals from at least one pair of the plurality of sensors;
program instructions that adaptively filter the noise reference to generate a filtered noise reference; and
program instructions that subtract the filtered noise reference from the main beam signal to generate a noise-reduced output of the beam-forming array, and control the adaptation of the filtering of the noise reference to minimize components of the filtered noise reference that are uncorrelated with noise in the main beam signal.

\* \* \* \* \*

UNITED STATES PATENT AND TRADEMARK OFFICE
CERTIFICATE OF CORRECTION

PATENT NO. : 11,025,324 B1
APPLICATION NO. : 16/848984
DATED : June 1, 2021
INVENTOR(S) : Samuel P. Ebenezer It is certified that error appears in the above-identified patent and that said Letters Patent is hereby corrected as shown below:

In the Specification

In Column 3, Line 1, delete "DESCRIPTION" and insert -- DETAILED DESCRIPTION --, therefor.

In Column 3, Line 45, delete "interface 16," and insert -- interface 18, --, therefor.

In Column 4, Line 5, delete "reverberation. and" and insert -- reverberation, and --, therefor.

In Column 4, Line 48, delete "$X_{i+1}[n]$" and insert -- $X_{i+1}[n]$, --, therefor.

In Column 5, Line 53, delete "$X_{i+1}[n]$ In" and insert -- $X_{i+1}[n]$. In --, therefor.

In Column 12, Line 10, delete "the at" and insert -- the at least --, therefor.

In the Claims

In Column 13, Line 21, in Claim 3, delete "the at" and insert -- the at least --, therefor.

In Column 14, Line 63, in Claim 17, delete "the at" and insert -- the at least --, therefor.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*